United States Patent [19]

Crouch

[11] 4,378,613

[45] Apr. 5, 1983

[54] FISH SKINNING APPARATUS

[76] Inventor: Joseph Crouch, Pleasant Valley Rd., Cumberland, Me.

[21] Appl. No.: 313,384

[22] Filed: Oct. 21, 1981

[51] Int. Cl.³ .......................... A22B 5/16; A22C 25/17
[52] U.S. Cl. ........................................... 17/62; 17/21; 83/168; 99/589
[58] Field of Search ................. 17/21, 62, 50; 99/589; 83/168

[56] References Cited

U.S. PATENT DOCUMENTS

| | | | |
|---|---|---|---|
| 2,605,495 | 8/1952 | Daniels | 17/62 |
| 3,094,739 | 6/1963 | Ericksen | 17/62 |
| 3,240,243 | 3/1966 | Golick | 83/168 |
| 3,613,154 | 10/1971 | Townsend | 17/62 |
| 3,769,903 | 11/1973 | Greider | 17/62 X |
| 4,327,633 | 5/1982 | Leining et al. | 17/21 X |

*Primary Examiner*—Willie G. Abercrombie

[57] ABSTRACT

Fish skinning apparatus has a skinning assembly receiving fish, skin side down, from the upper section of a chute the lower section of which receives and discharges the skin-free fillets. The assembly includes a pair of transverse rotors one of which is driven and both of which have lengthwise meshing teeth. The edge of a transverse knife is disposed to engage the flesh of a fillet adjacent the skin and form a flap caught between the rotors and pulled thereby from the flesh. One rotor is movable away from the other as required to accommodate the skins. The apparatus has a flushing system ensuring the maintenance of the quality of the product and the assembly components in condition for the efficient operation of the apparatus.

14 Claims, 5 Drawing Figures

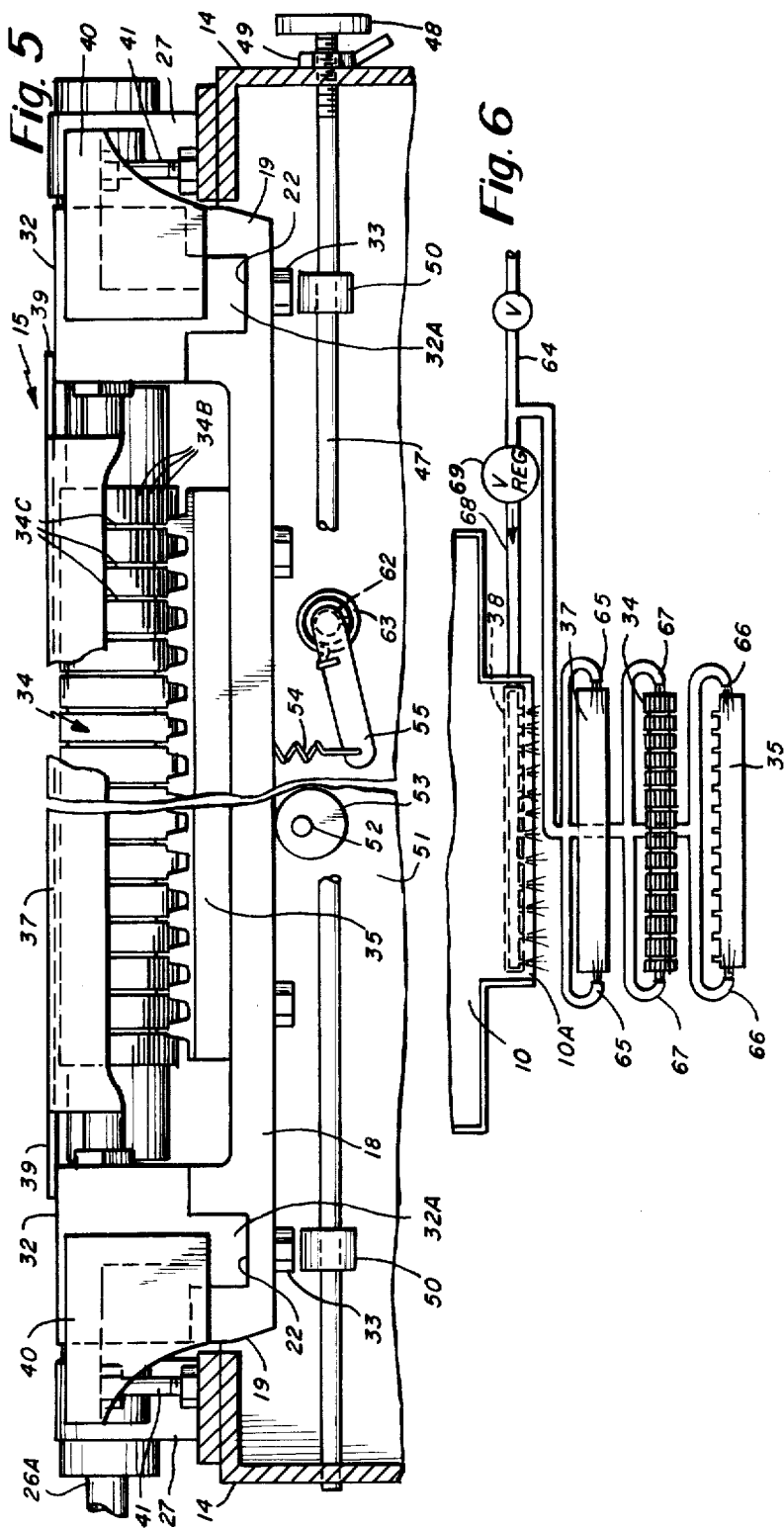

FISH SKINNING APPARATUS

BACKGROUND REFERENCES

U.S. Pat. No. 2,605,495
U.S. Pat. No. 3,094,739
U.S. Pat. No. 3,613,154

BACKGROUND OF THE INVENTION

The need for apparatus for removing skin from fillets has long been recognized as evidenced by the above cited patents.

As far as I am aware, fish skinning apparatus used commercially at the present time, while effective, is both bulky and costly so that their acceptance is, in general, limited to the larger processing plants. As a consequence, there is a potential demand for less expensive and smaller apparatus provided that it is competitive in efficiency.

I am aware that a skinning apparatus was once manufactured that utilized first and second rotors having lengthwise meshing teeth. The first rotor was driven and the second was movable away from it against a yieldable resistance to permit skins to pass between the rotors. A knife, the cutting edge of which extended transversely of the rotors, cut into the flesh of fish when slid down a wet slide, flesh side down, against it until a flap of skin was formed. The cutting edge of the knife was so located that such flaps became caught between the rotors and the skin was thus pulled from the flesh. It was recognized that portions of flesh and skin would soon interfere with the operation of the apparatus and, for that reason a fixed transverse rake or comb was employed having fingers or teeth which entered annular gaps spaced lengthwise of the second rotor.

In U.S. Pat. No. 3,094,739 apparatus of the above type utilized water jets instead of fingers for that purpose. U.S. Pat. Nos. 2,605,495 and 3,613,154 also employed water jets for similar purposes.

THE PRESENT INVENTION

The general objective of the present invention is to provide fish skinning apparatus that may be relatively small in size and cost and that will be highly efficient in operation and operable to produce unblemished fillets.

In accordance with the invention, this objective is attained with apparatus including a pair of skin-gripping rotors having lengthwise teeth and a knife disposed transversely of a wet chute in a position relative to the nip of the rotors such that its cutting edge penetrates the flesh into contact with the skin of a fillet sliding against the knife thus to form a flap which becomes caught between the rotors. The skin is thereby pulled through the rotors with the flesh pulled against the edge of the knife to free the flesh from the skin. The apparatus is provided with means operable to discharge a water jet lengthwise of and against the edge of the knife from a position adjacent at least one end and preferably both ends thereof which jet or jets flush from the knife edge material that would collect thereon or form a film thereon as such would prevent a clean, smooth skinned surface with the skinned side then erose and less attractive than the other side of the fillet and with substantial amounts of flesh particles carried with the skin to foul the lengthwise rotor teeth.

Another objective of the present invention is to prevent the fouling of the second rotor, an objective attained by means of a lengthwise jet or jets of water employed for the purpose of preventing the teeth of the second rotor from becoming fouled. The jet or jets may be directed lengthwise of the rotor teeth from locations adjacent either or both ends thereof, against the comb from positions adjacent either or both ends thereof, if such be employed with a second rotor having its teeth interrupted by spaced annular caps, or against both the rotor and the comb from positions adjacent either or both of their ends.

PRIOR ART STATEMENT

The cited patents and the apparatus to which reference has been made are the only prior art known to me of interest in connection with the present invention.

Of these, U.S. Pat. No. 3,094,739 discloses many structural features incorporated in the disclosed embodiment of the present invention and also the use of jets of water directed to clean the annular grooves in the second rotor and water discharged radially into the grooves from an axial passageway in that rotor.

U.S. Pat. No. 3,605,495 disclosed the use of water jets directed towards both rotors at right angles to their axes and U.S. Pat. No. 3,613,154 disclosed the discharge of jets of water against the skin-engaging rotor in directions normal thereto.

None of the prior art discloses or suggests the use of water jets directed lengthwise the edge of the knife or lengthwise and against other members of the apparatus which receive particles of flesh or other material from the flesh side of the skin.

BRIEF DESCRIPTION OF THE DRAWINGS

The accompanying drawings illustrated a preferred embodiment of the invention

FIG. 5 is a section taken approximately along the indicated line 5—5 of FIG. 4; and FIG. 6 is a schematic view showing the water supply system and the relation of the jet establishing outlets to the components of the assembly.

THE PREFERRED EMBODIMENT OF THE INVENTION

The apparatus illustrated by the drawings has a tray 10 supported at a convenient height by framework 11 with a downwardly inclined chute opening into the tray, centrally of its front wall. The chute includes an upper section 12 and a lower section 13, the latter for skinned fillets which are either discharged therefrom onto a conveyor or into a suitable receptacle.

Figure 1:
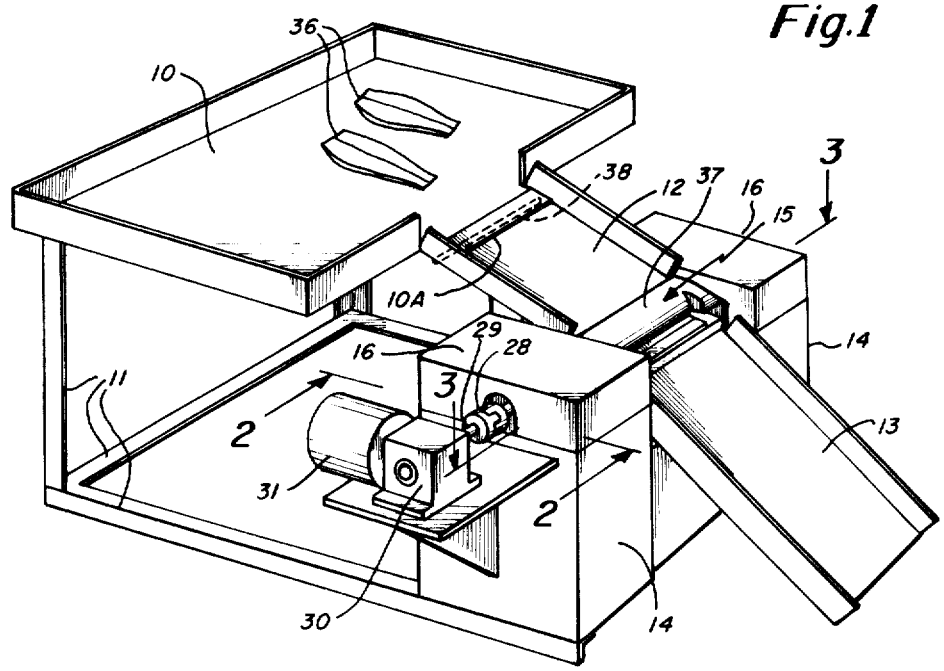
FIG. 1 is a front perspective view of fish skinning apparatus in accordance with the invention.
Figure 2:
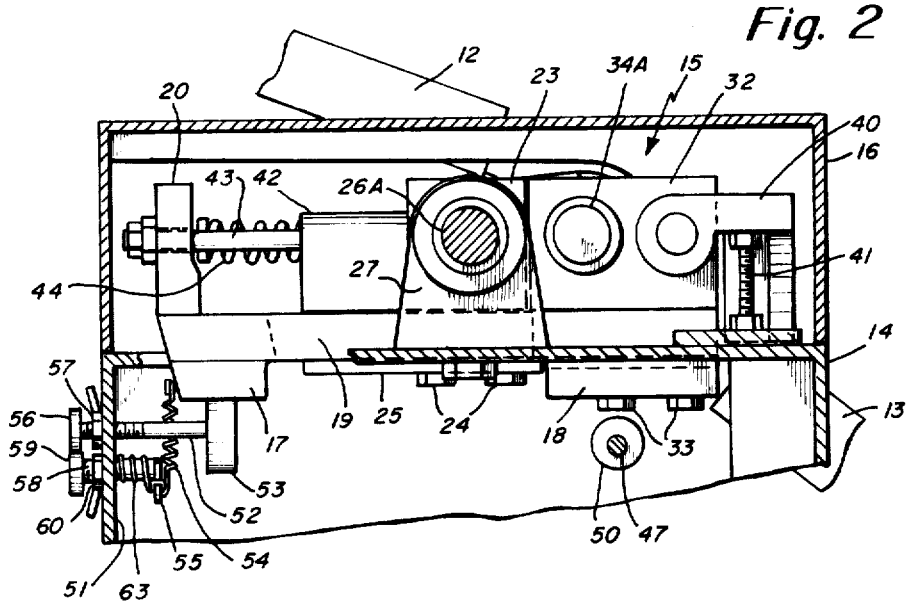
FIG. 2 is a section, on an increase in scale, taken appoximately along the indicated line 2—2 of FIG. 1.
Figure 4:
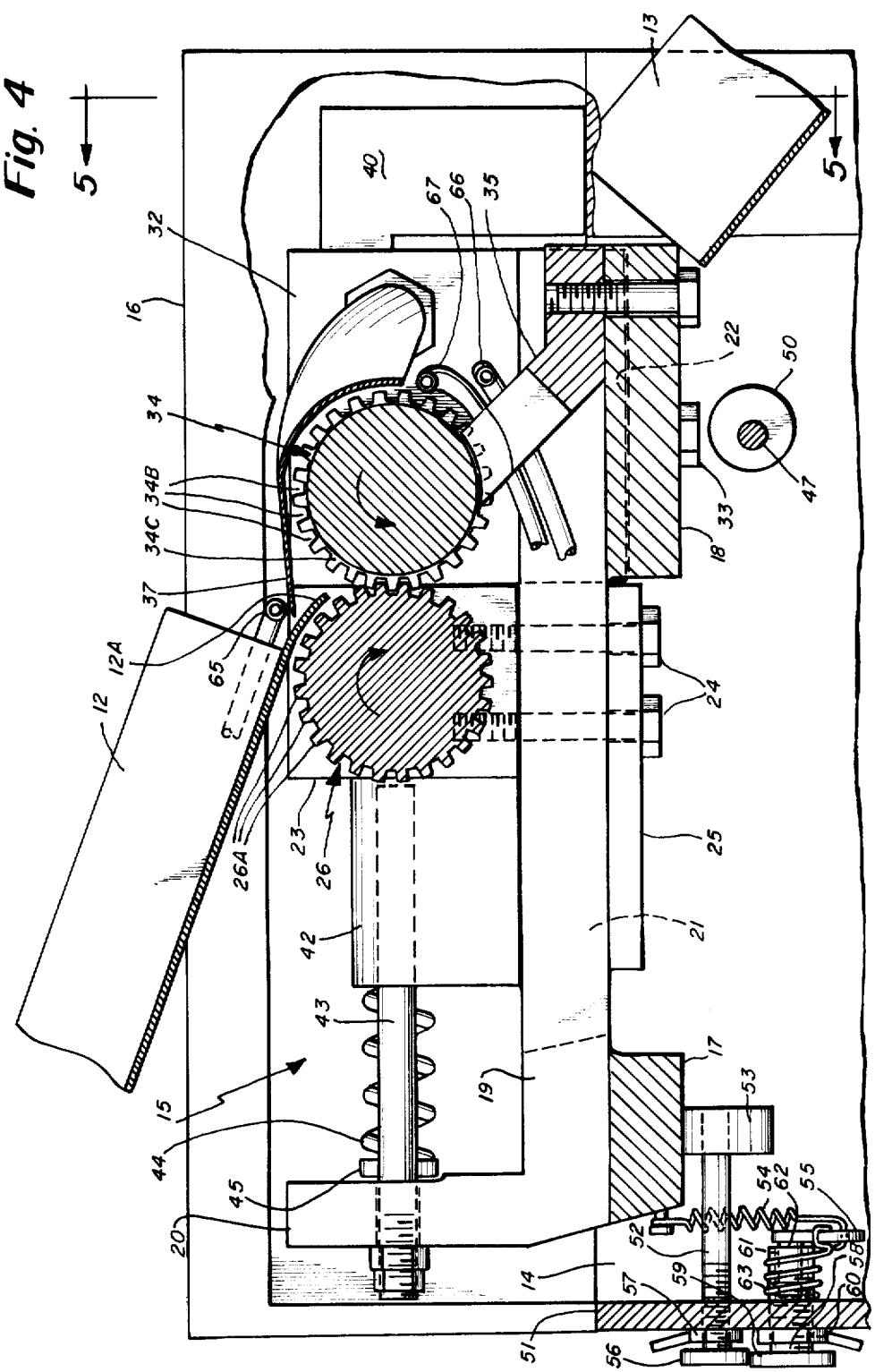
FIG. 4 is a section, on a further increase in scale, taken approximately along the indicated line 4—4 of FIG. 3.

Between the chute sections and side supports 14 there is located the fish skinning assembly, generally indicated at 15. The supports 14 have covers 16 which are shown only in FIGS. 1 and 4.

The assembly is shown as having a base in the form of a frame consisting of a front or upstream transverse portion 17 and a rear or downstream transverse portion 18 spaced therefrom by identical side portions 19.

Each side portion 19 has an upwardly disposed wall 20 at its front end rearwardly of which there is a central slot 21. The slots 21 become grooves 22 at the rear corners of the frame, see FIG. 5. Each of a first pair of mounts 23 is slidably connected to the slot 21 by bolts 24 to an underlying slide plate 25. The shaft ends 26A of a first rotor 26 extend through and are journalled in the mounts 23 and are rotatably held by bearing blocks 27 anchored to the supports 14. Fittings with which the mounts 23 and bearing blocks 27 for use in lubricating the rotor ends 26A are omitted to simplify the drawings. The rotor has a series of teeth 26B extending lengthwise thereof for the full width of the chute. One shaft end 26A is connected by a jaw clutch 28 to the drive shaft 29 of a gear box 30 driven by an electric motor 31 mounted on one of the supports 14.

Each of a second pair of mounts 32 has a rib or tongue 32A entrant of the groove 22 and is anchored therein by bolts 33. The shaft ends 34A of a second rotor 34 are journalled in the mounts 32 provided with fittings, not shown, for use in lubricating the shaft ends 34A. The rotor 34 has lengthwise teeth 34B interrupted by spaced annular gaps 34C, the teeth meshing with the teeth 26B of the rotor 26. Fixed on the frame portion 18 is a comb 35 the teeth of which are entrant of respective ones of the gaps 34C.

It will be noted that the discharge end of the chute section 12 is so positioned and inclined that an unskinned fillet 36, when sliding down it, skin side down, will engage the cutting edge of a knife 37 extending transversely of above and close to a downwardly curved lip 12A at the discharge end of the chute 12. The chute section 12 is shown as maintained slippery by water flowing down it from a header 38 located under a lip 10A of the tray 10 which overlies the upper end of the chute section 12. In use, gravity forces each fillet 36 down the wet chute section against the edge of the knife 37 which penetrates the flesh close to and into contact with the skin thus to form a flap which becomes caught in the nip of the two rotors so that they pull the skin downwardly and the flesh against the knife 37 with the skin thereby pulled from the flesh. The skinned fillets slide over the knife 37, the rear portion of which is arcuate in cross section and overlies the second rotor 34, and down the chute section 13.

The knife 37 has pivots 37A adjacent its rear or lower edge which extend through and are pivotally supported by the mounts 32. Adjacent its cutting edge, the knife 37 has tabs 39 engageable with the upper surface of the mounts 32 to limit the extent to which the knife may be pivoted forwardly relative to the assembly 15 to establish a predetermined clearance between the knife edge and the lip 12A. The ends of the pivots 37A have arms 40 resting on vertically adjustable stops 41 on the supports 14 which establish the wanted maximum extent to which the knife may be pivoted rearwardly with respect to the assembly.

Figure 3:
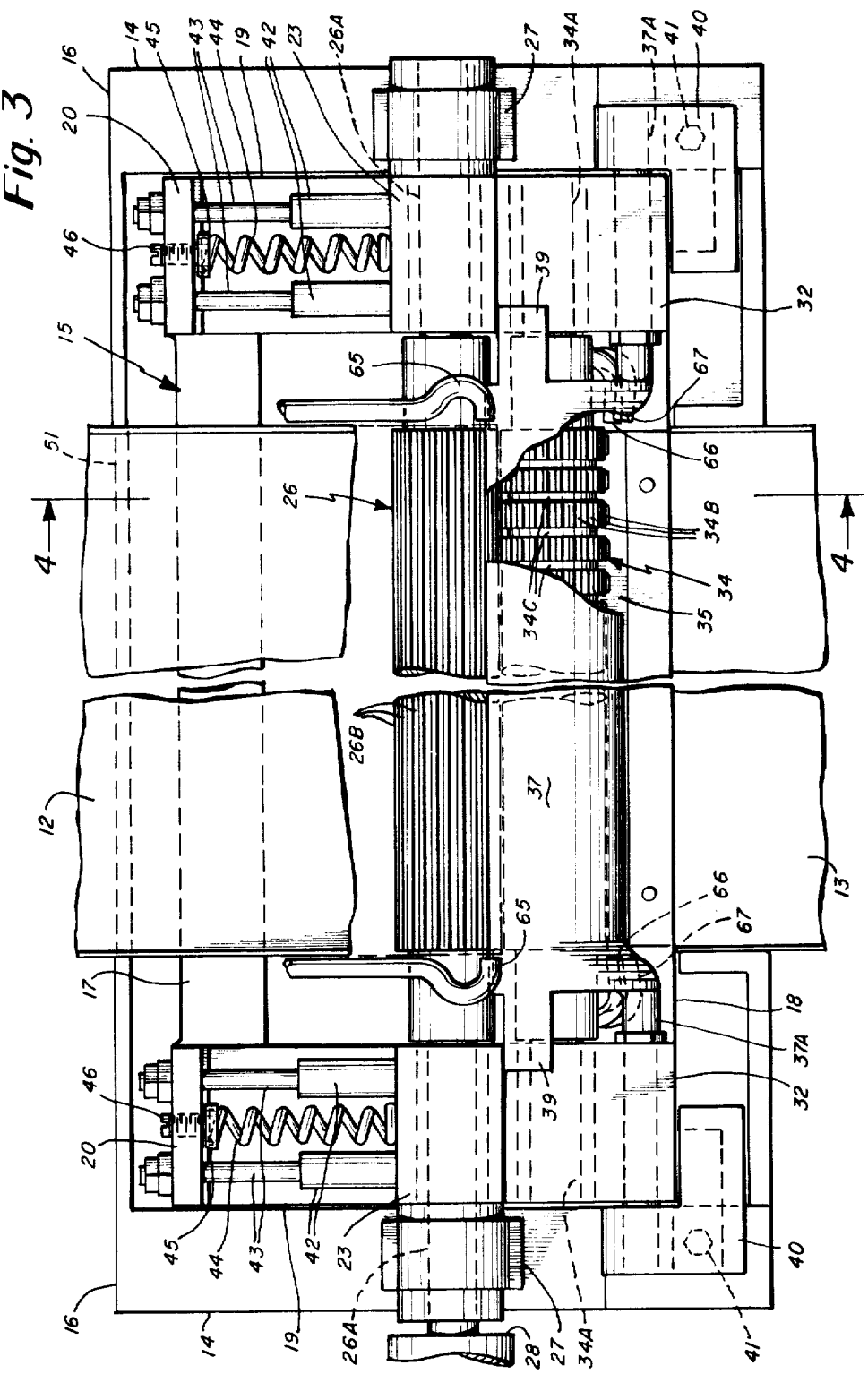
FIG. 3 is a section on the scale of FIG. 2, taken approximately along the indicated line 3—3 of FIG. 1.

It will be noted that the mounts 23 are held in a fixed position since the bearings blocks 27 are secured to the supports 14 and that because of the slidable connections between the mounts 23 and the frame of the assembly 15, the frame and accordingly the second rotor is movable forwardly or rearwardly with respect to the blocks 27 and the first rotor. Each mount 23 is shown as having a pair of parallel, forwardly extending holders 42 in each of which is seated a rod 43 extending forwardly through the adjacent wall 20 with lock nuts fixed on its exposed end. A compression spring 44 is held under tension between the rods 43 of each mount 23 and the associated wall 20 with the springs 44 yieldably holding the mounts 23 against the fixed mounts 32 but permitting movement of the mounts 23 away from the mounts 32 in order to permit the second rotor to move slightly away from the rotor 26 as skins are pulled through them. The forward end of each spring 44 seats in a cup 45 carried by a screw 46 threaded through the adjacent wall 20 to enable spring tension to be adjusted, see FIG. 3.

As thus far described, the assembly 15 is supported only by the bearing blocks 26 so that it is free to rock with respect to the axis of the first rotor. Below the rear of the assembly there is a transverse shaft 47 rotatably held by the supports 14 with one end exposed and provided with a handle 48 and with a lock nut 49 threaded on the exposed end for engagement with the side of the support 14. The shaft rod 47 is provided with a pair of cams 50 each engageable with a head of a bolt 33 and the cams are turned initially to permit the assembly to be so rocked that its rear portion is depressed to a limited extent before the bolt heads engage the cams 50. Such limited rocking occurs whenever a skin is gripped and pulled by the rotors and is attended by the edge of the knife being moved closer to the lip 12A and more nearly in the plane of the chute 12. It should be noted that the knife edge is relatively dull and provides a straight edge in contact with the skins and against which the flesh is pulled.

The fronts of the supports 14 are interconnected by a wall 51 which has a centrally located member 52 threaded rearwardly therethrough and which is provided with a cam 53 on which the front of the frame of the assembly rests with the above referred to rocking of the assembly yieldably opposed by a spring 54 connected to the frame portion 17 and an arm 55. The member 52, like the rod 47 has a handle 56 by which the cam 53 may be turned into a wanted position and has a lock nut 57 threaded thereon for engagement with the wall 51. When skin is being pulled through the rotors, the assembly is tilted against the cams 50 against the action of the spring 54.

A member 58 is threaded through the wall 51 with its outer end provided with a handle 59 and a lock nut 60 threaded on said outer end for locking engagement with the wall 51. The inner end of the member 58 is in the form of a socket 61 which rotatably receives and supports the pivot 62 of the arm 55 and supports a spring 63 having one of its ends anchored thereto and its other end connected to the arm 55 to yieldably hold it against being pulled upwardly with its resistance adjusted and established by turning the member 58 in one direction or the other.

In accordance with the invention, the apparatus is provided with means ensuring both its operation at peak efficiency for long intervals and the quality of the skinned fillets, particularly the appearance of their skinned surfaces.

Such means are a flushing system for the members of the assembly that come in contact with the skins or become fouled by flesh particles or liquids removed with the skins.

The flushing system, see FIG. 6, includes a conduit 64 having a first pair of outlet ends 65, each adjacent the appropriate end of the cutting edge of the knife 37 and-directed lengthwise thereagainst to keep the edge portion clean which ensures that its action will continuously cause the flesh to be pulled cleanly and smoothly providing fillets that are high quality in appearance.

While the flushing of the knife edge minimizes the passage of flesh or liquids contained therein through the nip of the rotors, it is necessary to prevent the second rotor from becoming fouled. To that end, each of a second pair of outlets 66 is disposed adjacent the appropriate end of the comb 35 and directed lengthwise thereagainst to flush it and its teeth continuously. In addition, each of a third pair of outlets 67 is disposed to direct a jet of water lengthwise of the teeth of the second rotor 34 thus to continuously flush them. As shown in FIG. 6, the conduit 64 includes a branch 68 to the header 38 and provided with a flow and pressure regulator 69.

I claim:

1. Fish skinning apparatus including a chute down which a fish, skin side down, will slide under the influence of gravity, a knife member disposed transversely of the chute adjacent the outfeed end thereof and in a position to be engaged by a fish sliding down said chute and then to so penetrate the flesh as to form a flap of skin, first and second rotor members each of which has lengthwise teeth which are in mesh, a drive for said rotor members, said rotor members so disposed relative to said outfeed end of the chute and to said knife member as to catch said flap and pull said fish against the knife member until the skin is pulled free from the flesh, and flushing means having discharge outlet means disposed substantially parallel to an elongated axis of at least one of said members and operable to discharge a jet of water against and lengthwise of at least one of the members that will receive materials from the flesh side of the skins from a position adjacent at least one end of said one member.

2. The fish skinning apparatus of claim 1 in which said one member is the knife member.

3. The fish skinning apparatus of claim 1 in which said one member is the rotor member engaging the flesh side of the skin.

4. The fish skinning apparatus of claim 1 in which the rotor engaging the flesh side of the skin has its teeth interrupted by a series of annular gaps spaced lengthwise thereof and the apparatus includes a comb the teeth of which enter appropriate ones of the gaps and said one member is said comb.

5. The fish skinning apparatus of claim 2 in which said flusing means is also operable to discharge at least one jet of water against and lengthwise of the rotor member engaging the flesh side of the skin.

6. The fish skinning apparatus of claim 2 in which the rotor engaging the flesh side of the skin has its teeth interrupted by a series of annular gaps spaced lengthwise thereof and the apparatus includes a comb the teeth of which enter appropriate ones of the gaps and the flushing means is also operable to discharge at least one jet of water lengthwise and against said comb.

7. The fish skinning apparatus of claim 6 in which the flushing means is also operable to discharge at least one jet of water lengthwise and against said skin-engaging rotor.

8. The fish skinning apparatus of claim 1 in which said flushing means is operable to discharge a jet of water against and lengthwise of at least one of said members engaging the flesh side of the skin from positions adjacent both ends thereof.

9. The fish skinning apparatus of claim 8 in which said one member is the knife member.

10. The fish skinning apparatus of claim 8 in which said one member is the rotor member engaging the flesh side of the skin.

11. The fish skinning apparatus of claim 8 in which the rotor engaging the flesh side of the skins has its teeth interrupted by a series of annular gaps spaced lengthwise thereof and the apparatus includes a comb which is said one member and the teeth of which are entrant of the appropriate ones of the gaps and the flushing means is operable to discharge a water jet against said comb.

12. The fish skinning apparatus of claim 8 in which the flushing means is operable to discharge said water jets against and lengthwise of both the knife member and the rotor member engaging the flesh side of the skin.

13. The fish skinning apparatus of claim 9 in which the rotor engaging the flesh side of the skins has its teeth interrupted by a series of annular gaps spaced lengthwise thereof, the apparatus includes a comb the teeth of which enter appropriate ones of the gaps, and the flushing means is also operable to discharge water jets against and lengthwise of the comb.

14. The fish skinning apparatus of claim 13 in which the flushing means is also operable to discharge water jets lengthwise and against the skin engaging rotor.

* * * * *